United States Patent [19]
Lee et al.

[11] Patent Number: 5,940,434
[45] Date of Patent: Aug. 17, 1999

[54] WALSH-QPSK CHIP MODULATION APPARATUS FOR GENERATING SIGNAL WAVEFORM IN A DIRECT SEQUENCE SPREAD SPECTRUM COMMUNICATION SYSTEM

[75] Inventors: Dong Wook Lee; Hun Lee; Myoung Jin Kim, all of Daejon-Shi, Rep. of Korea

[73] Assignees: Electronics and Telecommunications Research Institute, Daejon-Shi; Dacom Corporation, Seoul, both of Rep. of Korea

[21] Appl. No.: 08/911,398

[22] Filed: Aug. 14, 1997

[30] Foreign Application Priority Data

Aug. 14, 1996 [KR] Rep. of Korea ................. 96-33691

[51] Int. Cl.$^6$ ................................................ H04B 1/707
[52] U.S. Cl. ........................................ 375/206; 370/335
[58] Field of Search ............................ 375/206, 200; 370/320, 335, 342, 441, 479, 209

[56] References Cited

U.S. PATENT DOCUMENTS

| | | | |
|---|---|---|---|
| 5,103,459 | 4/1992 | Gilhousen et al. | 370/209 |
| 5,309,474 | 5/1994 | Gilhousen et al. | 370/209 |
| 5,511,073 | 4/1996 | Padovani et al. | 370/471 |
| 5,608,722 | 3/1997 | Miller | 370/320 |
| 5,680,395 | 10/1997 | Weaver, Jr. et al. | 370/331 |
| 5,712,869 | 1/1998 | Lee et al. | 375/206 |

*Primary Examiner*—Don N. Vo
*Assistant Examiner*—Lenny Jiang
*Attorney, Agent, or Firm*—Cohen, Pontani, Lieberman & Pavane

[57] ABSTRACT

In a direct sequence spread spectrum communications system wherein user binary information symbols are spread spectrum modulated and transmitted to the other party, a non-coherent Walsh QPSK and a coherent Walsh QPSK modulation methods, wherein the PN spreading sequences for inphase and quadrature data in a conventional QPSK PN modulation scheme are coded by Walsh sequences indexed by a special rule to reduce the envelope variation of the transmitted signal, can reduce the envelope variation of transmit signal. And, in a direct sequence spread spectrum communications system wherein several user binary information symbols are spread spectrum modulated, the information symbols of each user are covered by user-specified different Walsh codes and transmitted to the other party, a QPSK modulation methods, wherein the polarity of quadrature PN spreading sequence of a user is controlled by a system controller to make the number of users using the quadrature PN sequence equal to that of users using NOT of the sequence, can reduce the envelope variation of transmit signal.

3 Claims, 4 Drawing Sheets

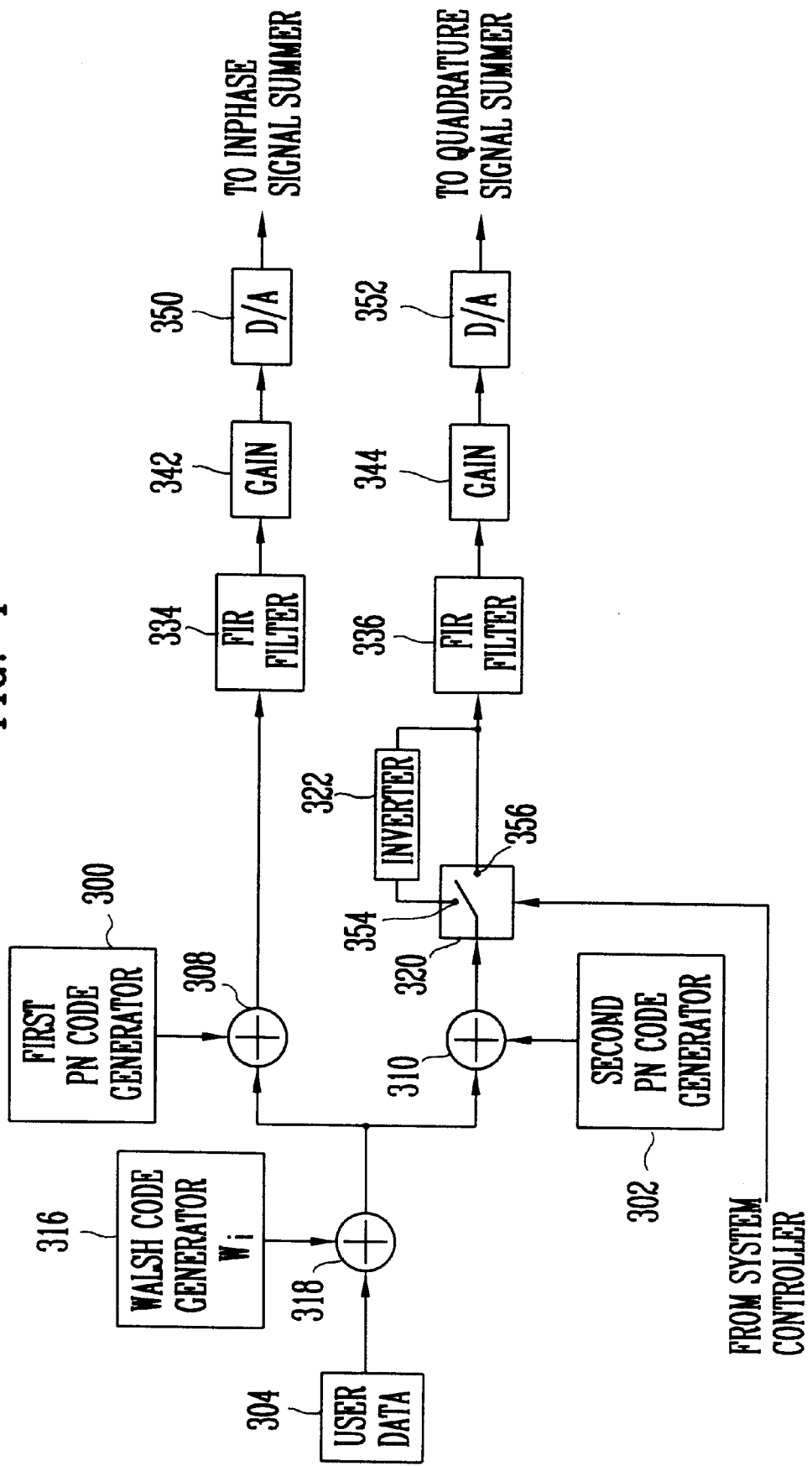

WALSH-QPSK CHIP MODULATION APPARATUS FOR GENERATING SIGNAL WAVEFORM IN A DIRECT SEQUENCE SPREAD SPECTRUM COMMUNICATION SYSTEM

FIELD OF THE INVENTION

The present invention relates to a PN code chip modulation apparatus for direct sequence spread spectrum communication systems.

BACKGROUND OF THE INVENTION

Generally, a direct sequence code division multiple access (DS-CDMA) is one of multi-user communication methods, in which several users can communicate simultaneously by using direct-sequence spread-spectrum(DSSS) techniques in which user data are transmitted after multiplied by an unique code allocated to each user. The chip rate of the code is tens or hundreds times higher than transmit data rate.

Several chip modulation methods for DS-CDMA systems have been proposed for cellular, personal communications services and wireless local loop applications.

Important requirements for a portable terminal in wireless applications with mobility are low cost, low power consumption, small size and light-weight. To meet the requirements of low power consumption, an efficient power amplifier might be used. From the point of view of service providers, spectral efficiency is also an important requirement. However, usually a spectrally efficient signal has large envelope variation. The large envelope variation of the transmitted signal results in increasing the adjacent channel interference and degrading the system performance due to spectral regeneration at the output of a nonlinear power amplifier.

Both non-coherent M-ary orthogonal signaling for data modulation with OQPSK chip modulation [EIA/TIA/IS-95, "Mobile station-base station compatibility standard for dual-mode wideband spread spectrum cellular system," July 1993], and coherent QPSK data modulation with the QPSK data modulation with the QPSK chip modulation [Proposed Wideband CDMA PCS Standard, October 1994, OKI Co.], have been proposed for a DS-CDMA portable terminal. Also coherent QPSK data modulation with the QPSK chip modulation has been proposed for a for a base station of a DS-CDMA cellular telephone system [System and Method for Generating Signal Waveforms in a CDMA Cellular Telephone System, Jun. 25 1990, U.S. application Ser. No. 543,496, Issue No. 5,103,456].

In the conventional non-coherent M-ary orthogonal signaling for data modulation with OQPSK chip modulation, $\log_2 M$ bits of user data are mapped into one element of a set of M orthogonal binary sequences. Two different PN codes, called inphase and quadrature PN codes, allocated to the user are multiplied by the selected binary sequence, respectively, and input to inphase and quadrature data input port of the conventional OQPSK modulator, respectively. Using the non-coherent OQPSK PN modulation for a portable terminal, due to a delay of a half PN chip duration in the quadrature component of a transmitted signal, there is some self interference between the inphase and the quadrature components, although it is typically much smaller than the multiple access interference from the other users.

In a coherent direct sequence spread spectrum communication system, a pilot signal should be sent with the data signal to inform the other party on the phase information of the carrier modulated by the data signal. Commonly, the pilot signal is also a direct sequence spread spectrum signal in which a sequence with all zero's in logical value is spread by PN codes. The correlation coefficients of PN codes used in spreading data and those in spreading pilot symbols are zero or very low values such that the other party can distinguish between the pilot signal and the user data signal.

In the conventional coherent QPSK data modulation with the QPSK chip modulation, there are three channels; pilot, data and signaling channels. In this method, the pilot symbols, signaling symbols and user data bits, are spread by a same PN code, respectively. After spreading, they are covered by different Walsh sequences, where different Walsh sequences are orthogonal to each other, to be distinguished among them at the other party. The sum of pilot and data signals and the sum of signaling and data signals are input to the inphase data and quadrature data input ports of the conventional QPSK modulator, respectively. Due to the sum of two signals the envelope variation of transmitted signal becomes very high.

Using the coherent QPSK data modulation with QPSK chip modulation for a portable terminal, the sum of the pilot and the data channels exhibits a high envelope variation and a large phase change. Even though the envelope variation of transmitted signal is a minor problem in a base station since in the base station the power consumption is not critical, the reduction of envelope variation of transmitted signal might be helpful for improvement of whole system performance since the portable terminal might use a limiter at the receiver to reduce the terminal cost by eliminating the emphasis of the receiver AGC chain [J. Boccuzzi, "Performance Evaluation of Non-linear Transmit Power Amplifier," IEEE Transactions on Vehicular technology, No. 2, pp. 220–228, May 1995].

It is an object of this invention to provide a special case of QPSK PN modulation, called Walsh-QPSK, which can exhibit lower envelope variation and smaller phase changes than the conventional PN modulation schemes.

SUMMARY OF THE INVENTION

The Walsh-QPSK chip modulation uses a property of the exclusive-OR of two adjacent-indexed rows of the Hadamard matrix which is newly found in this invention from the binary representation of Walsh function indexes [J. L. Shanks, "Computation of the Fast Walsh-Fourier transform," IEEE Transaction on Computers, pp. 457–459, May 1969], in which W(i,j), the element on the (i+1)-th row and (j+1)-th column (i and j=0, 1, 2, . . . , M−1) of the M-dimensional Hadamard matrix, has a binary value, 0 or 1. The exclusive-OR of W(2i, j) and W(2i+1, j) becomes 2nd row of the Hadamard matrix which has 0 for even number of j and 1 for odd number of j.

In the QPSK modulator, the transmitted signal is the sum of two carriers modulated by the input from the inphase data input port and the input from the quadrature data input port, of which frequencies are the same but the phase difference of the two carriers is 90°. In the conventional QPSK chip modulation, the inphase and the quadrature sequences, which are the result of multiplying inphase data with inphase PN code and quadrature data with quadrature PN code, respectively, are input to inphase and quadrature input data ports of conventional QPSK modulator. In the conventional OQPSK chip modulation, inphase and quadrature sequences are input to the inphase and the quadrature data input ports of the conventional QPSK modulator after delaying the quadrature sequences by a half PN chip.

The reason why the phase shift of the transmitted signal of the conventional OQPSK chip modulation is limited to 90° is because the half chip delay between inphase and quadrature sequences prevents from changing their polarities at the same time.

If two sequences, called Walsh sequences with index 2i and the (2i+1), which are repeats of the (2i+1) and the (2i+2) rows of the Hadamard matrix, respectively, are input to inphase and quadrature input data ports of the QPSK modulator, we can limit the phase shift of the transmitted signal to 90° since, from the property of the exclusive-OR of two adjacent-indexed rows of the Hadamard matrix, the inphase and the quadrature sequences do not change their polarities at the same time. However, this scheme cannot be used for DS-CDMA systems since the correlation between Walsh sequences with different time delay is very high and, as a result, the interference from the other user arrived at the receiver with different time delay is too high for several users to communicate simultaneously. Therefore, we need sequences which have same property of the the exclusive-OR of two adjacent-indexed rows of the Hadamard matrix and a small correlation value between sequences with different time delay. We can obtain those sequences by multiplying Walsh sequences with a PN code. The PN code has a small correlation values between sequences with different time delays. The sequences obtained by multiplying Walsh sequences with a PN code also have small correlation values between sequences with different time delay. Two sequences obtained by multiplying two adjacent-indexed Walsh sequences with a PN code also have the same property of the exclusive-OR of two adjacent-indexed rows of the Hadamard matrix. Therefore, if these two sequences multiplied by the same data bit, respectively, are input to the inphase and the quadrature data input ports of the conventional QPSK modulator, without a half chip delay operation, the phase shift of the transmitted signal can be limited to 90° as does the conventional OQPSK chip modulation. Further, since the two inphase and quadrature sequences are orthogonal, under an ideal condition, the self-interference between inphase and quadrature components of transmitted signal can be eliminated.

A new coherent DS-CDMA QPSK chip modulation using the property of the exclusive-OR of two adjacent-indexed rows of the Hadamard matrix might be able to reduce the envelope variation and a large phase shift which occurs in the conventional coherent DS-CDMA QPSK chip modulation. From the property, we know that $W(2i, j) \oplus W(2i+1, j) = W(2k, j) \oplus W(2k+1, j) = W(1, j)$. This means that if $W(2i, j) = W(2k, j)$, then $W(2i+1, j) = W(2k+1, j)$, and if $W(2i, j) = \overline{W(2k, j)}$, then $W(2i+1, j) = \overline{W(2k+1, j)}$. When we used these four sequences, which are repeats of (2i+1)-th, (2i+2)-th, (2k+1)-th and (2k+2)-th rows of Hadamard matrix, as inphase and quadrature sequences of pilot signal and those of data signal, if the sum of inphase sequences of pilot and data signals increases, the sum of quadrature sequences of pilot and data signals also increases, and if the sum of inphase sequences of pilot and data signals decreases, the sum of quadrature sequences of pilot and data signals also decreases. When one of four sequences is replaced with logical NOT of the sequence, for example, four sequences, which are repeats of (2i+1)-th, (2i+2)-th, (2k+1)-th and logical NOT of (2k+2)-th rows of Hadamard matrix are used for inphase and quadrature sequences of pilot signal and those of data signals, then if the sum of inphase sequences of pilot and data signals increases, the sum of quadrature sequences of pilot and data signals decreases, and if the sum of inphase sequences of pilot and data signals decreases, the sum of quadrature sequences of pilot and data signals increases. This makes the envelope variation of the transmitted signal reduced. Using this method, we can obtain a similar signal constellation to that of $\pi/4$-QPSK, if the transmit power of the pilot signal is 6 db less than that of the data signal.

To reduce the envelope variation of transmitted signal of a base station currently used in the CDMA cellular system [EIA/TIA/IS-95, "Mobile station-base station compatibility standard for dual-mode wideband spread spectrum cellular system," July 1993], we consider a new simple method. [Data transmitter and receiver of a spread spectrum communication system using a pilot channel, U.S. Pat. No. 562,281]. In this system, each user data bit is spread by a unique Walsh sequence allocated to the user for other party to be able to extract the user data among received signals. This spread signal is multiplied by two PN codes, celled inphase and quadrature PN codes, respectively. The inphase and quadrature sequences of all users are summed, respectively. The sums of inphase and quadrature sequences of all users are input to the inphase and the quadrature data input ports of the conventional QPSK modulator. Let assume that there are only two user channels in a base station. For the same reason mentioned above, we can reduce the envelope variation of the transmitted signal by replacing a sequence of the four sequences with logical NOT of the sequence. For example, when the quadrature sequence of one of two users are replaced with logical NOT of the sequence, if the sum of inphase sequences of two users increases or decreases, the sum of quadrature sequences of two users decreases or increases. Therefore, the envelope variation of the transmitted signal can be reduced. When there are more than 2 users, a system controller controls the number of users, whose quadrature sequence is the logical NOT of the assigned sequence, is the half of the number of total users.

The present invention provides a substantial improvement over non-coherent and coherent direct sequence spread spectrum chip modulations with small envelope variation and a small phase shift.

BRIEF DESCRIPTION OF THE DRAWINGS

For fuller understanding of the nature and object of the invention, reference should be made to the following detailed description taken in conjunction with the accompanying drawings in which:

FIG. 4 is a block diagram of coherent chip modulation apparatus for a base station.

Similar reference characters refer to similar parts in the several views of the drawings.

DESCRIPTION OF THE INVENTION

The present invention will be described in detail by reference to the accompanying drawings.

Figure 1:
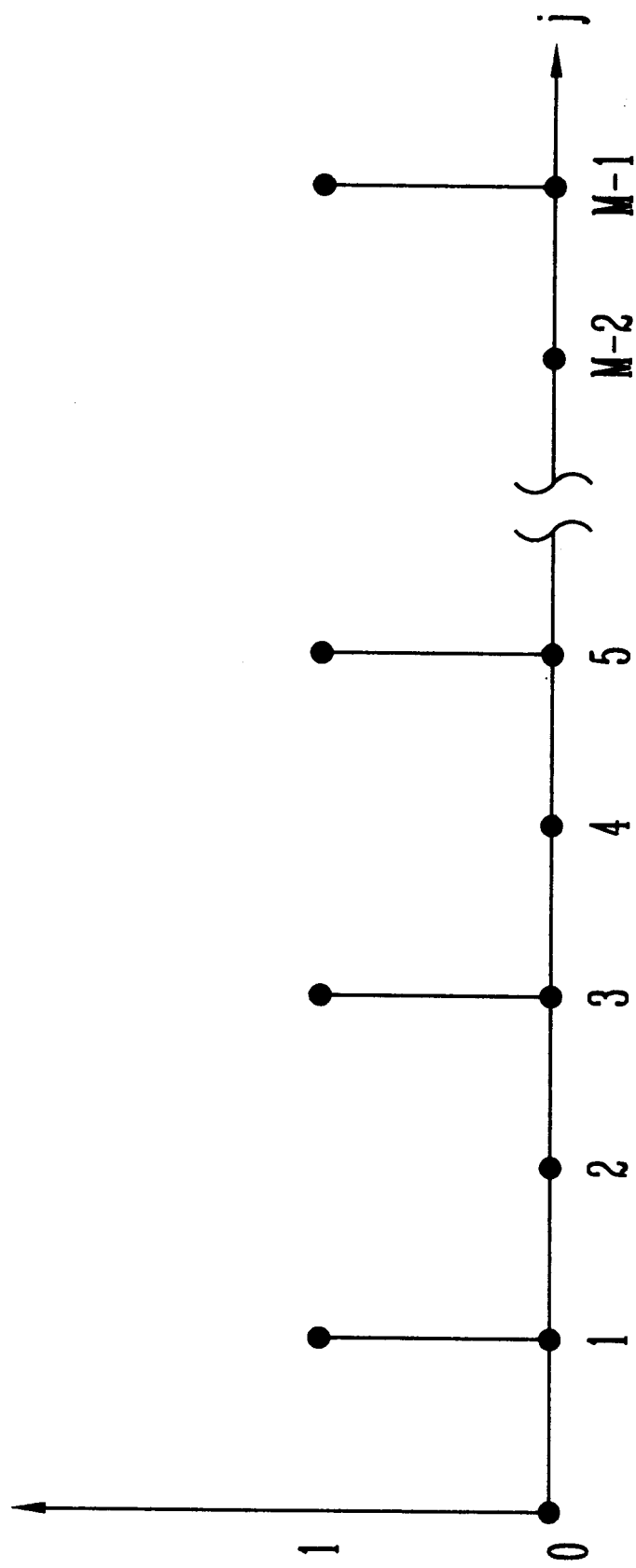
FIG. 1 is the property of exclusive-OR of two adjacent indexed Walsh sequences obtained from the Hadamard matrix.

It is well known that the Hadamard matrix can be generated by means of the following recursive procedure [J. L. Shanks, "Computation of the Fast Walsh-Fourier transform," IEEE Transactions on Computers, pp. 457–459, May 1969]:

$$H_1[0], H_2 = \begin{bmatrix} 0 & 0 \\ 0 & 1 \end{bmatrix}, H_{2M} = \begin{bmatrix} H_M & H_M \\ H_M & \overline{H_M} \end{bmatrix}$$

where M=$2^P$ for any integer p and $\overline{H}_M$ denotes the binary complement of $H_M$. The (i+1, j+1)-th element of the matrix $H_M$ is denoted by W(i, j). Then the exclusive-OR of W(2i, j) and W(2i+1, j) is equal to W(1, j) as shown in FIG. 1. The Walsh sequence with index of i, $W_i$, is a repeat of (i+1)-th row $H_M$.

Figure 2:
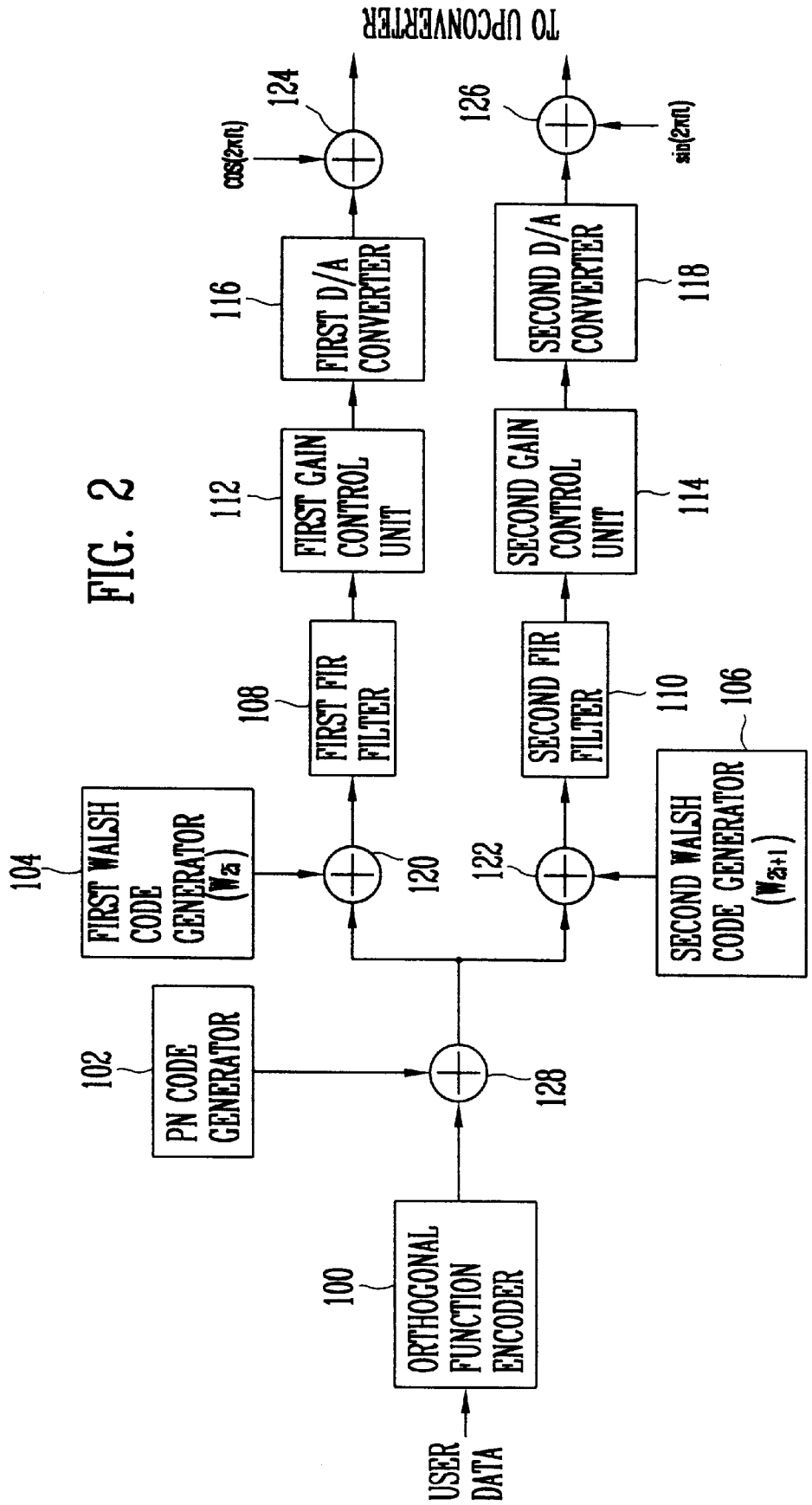
FIG. 2 is a block diagram of the non-coherent Walsh-QPSK chip modulation apparatus.

FIG. 2 illustrates in block diagram an exemplary non-coherent DS-CDMA Walsh-QPSK modulation apparatus in which the present invention is embodied.

In FIG.2, the non-coherent DS-CDMA Walsh-QPSK modulation apparatus includes an orthogonal function encoder 100 which is commonly used to map several bits of user data into an element of a set of orthogonal sequence. Typically, 64 rows of a 64 dimensional Hadamard matrix is used as a set of orthogonal sequences [EIA/TIA/IS-95, "Mobile station-base station compatibility standard for dual-mode wideband spread spectrum cellular system," July 1993]. Then 6 bits of data is converted into 64 modulation symbols which are the elements of a row of the 64 dimensional Hadamard matrix mapped by orthogonal function encoder 100. The modulation symbols and a PN code generated by a PN code generator 102 are combined in an exclusive-OR gate 128. Typically, chip rate of the PN code is 4 times faster than the symbol rate of the modulation symbol [EIA/TIA/IS-95, "Mobile station-base station compatibility standard for dual-mode wideband spread spectrum cellular system," July 1993] Therefore, the spectrum of the modulation symbol is spread by 4 times. A spread symbol, which is output of exclusive-OR gate 128, and a Walsh sequence with index 2i generated by a first Walsh code generator 104 are combined in exclusive-OR gate 120. The same spread symbol and a Walsh sequence with index 2i+1 generated by a second Walsh code generator 106 are combined in exclusive-OR gate 122. The symbol rates of codes generated by first Walsh code generator 104 and second Walsh code generator 106 are same as that of a code generated by PN code generator 102.

The inphase and quadrature sequences which are output of exclusive-OR gates 120 and 122, respectively, have binary values of 0 or 1. The binary values 0 and 1 in these sequences are converted into real values 1 or −1, respectively, in the first and second FIR (Finite Impulse Response) filters 108 and 110 before being passed through those FIR filters. Typically, first and second FIR filters 108 and 110 have the same finite impulse response which satisfies the spectrum specification of transmitted signal in a system. The values of outputs of first and second FIR filters 108 and 112 are multiplied by a gain in first and second gain control units 112 and 114, respectively, before being converted into analog signals in first and second D/A converters 116 and 118, respectively. Those two analog signals, outputs of first and second D/A converters 116 and 118, modulate two IF (intermediate frequency) quadrature carriers in first and second mixers 124 and 126, respectively. The frequency of modulated two if quadrature carriers, outputs of first and second mixer 124 and 126, are summed and converted up to radio frequency band at up-converter (not shown) to be transmitted to the other party through an amplifier (not shown).

Since exclusive-OR of the inphase and the quadrature sequences is the same as exclusive-OR of two adjacent indexed Walsh sequences, one of two sequences changes its polarity at a time, as does the OQPSK modulation. This makes the phase shift of transmitted signal limited to 90° if the impulse response of FIR filters is rectangular and its duration is same as the input symbol rate.

Further, since the inphase and the quadrature sequences are orthogonal, there is no self-interference between inphase and quadrature components of transmitted signal, which occurs in the conventional O-QPSK chip modulation,—due to correlation between two PN codes used to spread the inphase and quadrature data, respectively.

In FIG. 2, if we choose two Walsh sequences with index 0 and 1, first Walsh code generator 104 and exclusive-OR gate 120 do not need to exist since the walsh code with index 0 is consisted of 0's. Therefore, in that case, output of exclusive-OR gate 128 can directly input to first FIR filter 108. If two spread symbols which input to exclusive-OR gates 120 and 122 are different user information symbols spread by the same PN code generated by PN code generator 102, the signal constellation points pass through the vicinity area of the origin only in the symbol boundary. Therefore, even in that case, the phase shift of transmit signal can be limited to 90° and we can obtain the same signal characteristics as non-coherent Walsh-QPSK except only in the symbol boundary.

Figure 3:
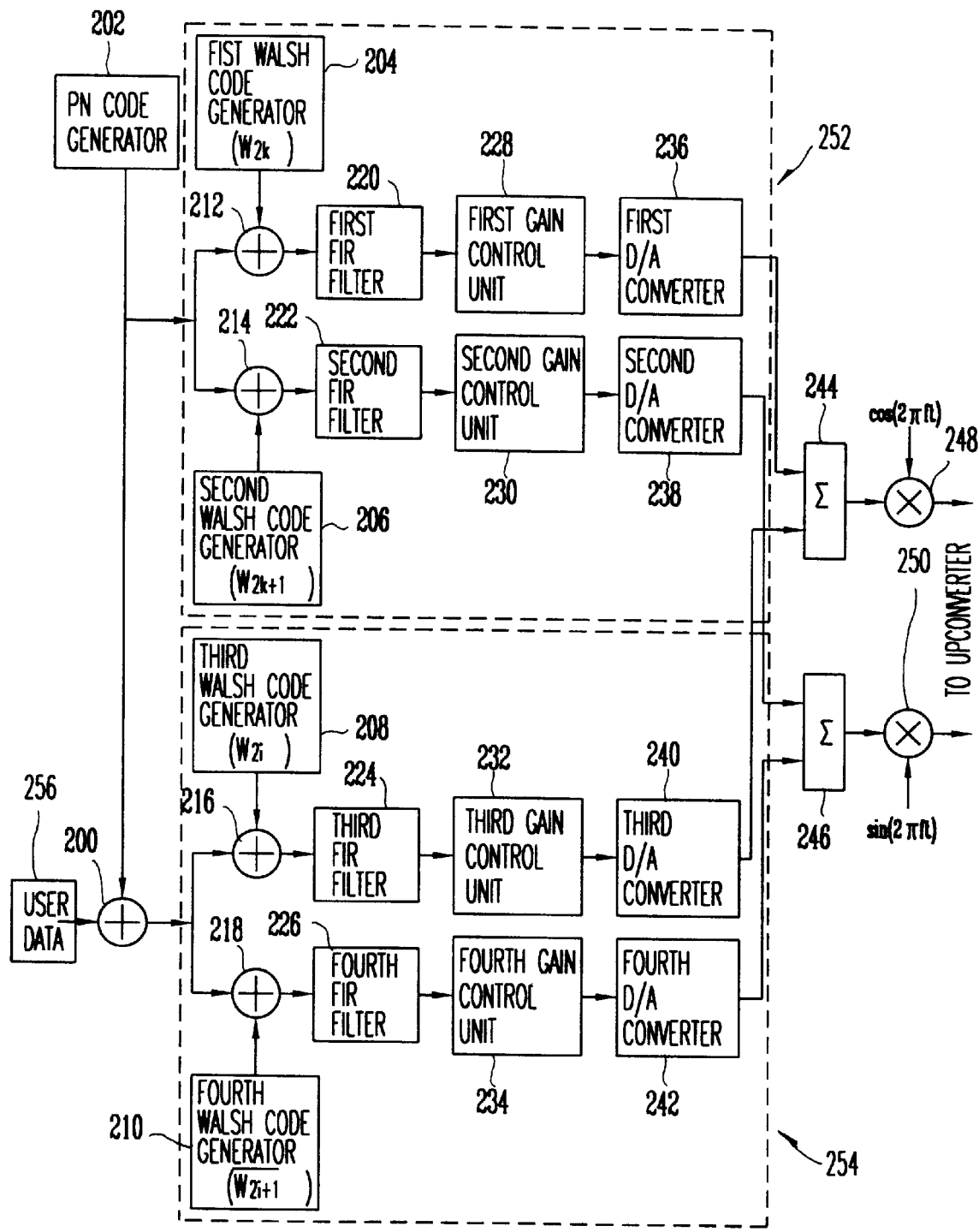
FIG. 3 is a block diagram of the coherent Walsh-QPSK chip modulation apparatus.

An exemplary coherent DS-CDMA Walsh-QPSK chip modulation apparatus in which present invention is embodied is illustrated in FIG. 3. In coherent communications system, a pilot signal should be sent to other party along with a data signal such that from the pilot signal the other party can know the phase of unmodulated carrier. Typically, in the coherent DS-CDMA system, the pilot signal is also a direct-sequence spread spectrum signal, in which a PN code spreading a pilot symbols, typically all zero's, modulates the carrier which has the same phase of the carrier modulated by a PN code spreading data bits. The other party is able to know the phase of unmodulated carrier after detecting the pilot signal. Typically, the PN code spreading pilot symbols is orthogonal to the PN code spreading data bits. Therefore, the other party can detect a pilot signal from the received signal.

In FIG. 3, a coherent DS-CDMA Walsh-QPSK chip modulation apparatus includes two signal generators, namely, a pilot signal generator 252 and a data signal generator 254. Pilot signal generator 252 generates inphase and quadrature analog signals with the exactly same method used in a non-coherent DS-CDMA Walsh-QPSK chip modulation apparatus. Data signal generator 254 also generates inphase and quadrature analog signals with the same method used in a non-coherent DS-CDMA Walsh-QPSK chip modulation apparatus, but in data signal generator 254, a Walsh code generated by fourth Walsh code generator 210 is logical NOT of the Walsh sequence with index 2i+1. In FIG. 3, there is no action to spread pilot symbol since pilot symbols are all zero's and the output of exclusive-OR gate with input of a PN code and pilot symbols becomes the PN code itself. Therefore the input of pilot signal generator 252 is a PN code itself generated by PN code generator 202. Gains of pilot signal controlled by gain control units and 230 228 and data signal controlled by gain control units 232 and 234 are controlled such that the power of transmit signal of pilot signal is typically 6 dB less than that of data signal.

In summers 244 and 246, pilot inphase and quadrature analog signals, outputs of first and second D/A converters 236 and 238, are added to data inphase and quadrature analog signals, outputs of third and fourth D/A converters 240 and 242, respectively. Inphase and quadrature analog signals, outputs of summers 244 and 246, modulate two IF (intermediate frequency) quadrature carriers in first and second mixers 248 and 250, respectively. The frequency of modulated two IF quadrature carriers, outputs of first and second mixer 248 and 250, are summed and converted up to radio frequency band at up-converter (not shown) to be transmitted to the other party through an amplifier (not shown).

The signal constellation for each outputs of pilot signal generator 252 and data signal generator 254 is exactly same as that of inphase and quadrature analog signals in a non-coherent DS-CDMA Walsh-QPSK chip modulation. From the property of exclusive-OR of adjacent-indexed Walsh sequences, when first Walsh code generator 204 generates a code symbol same as that generated by second Walsh code generator 206, third Walsh code generator 224 generates a code symbol opposite to that generated by fourth Walsh code generator 226. And when first Walsh code generator 204 generates a code symbol opposite to that generated by second Walsh code generator 206, third Walsh code generator 224 generates a code symbol same as that generated by fourth Walsh code generator 226. Therefore, when the sum of pilot and data inphase analog signals, outputs of first and third D/A converters 236 and 240, respectively, is constructive, the sum of pilot and data quadrature analog signals, outputs of second and fourth D/A converters 238 and 242, respectively, is destructive. And when the sum of pilot and data inphase analog signals, outputs of first and third D/A converters 236 and 240, respectively, is destructive, the sum of pilot and data quadrature analog signals, outputs of second and fourth D/A converters 238 and 242, respectively, is constructive. For this reason, the envelope variation of transmitted signal, which is defined as the square root of square sum of inphase and quadrature analog signals, is greatly reduced in comparison with conventional coherent DS-CDMA chip modulation apparatus.

As dose $\pi/4$-QPSK modulation, this makes the phase shift of transmitted signal limited to 135° if the impulse response of FIR filters is rectangular and its duration is same as the input symbol rate and transmit power of pilot signal is 6 dB less than that of data signal.

FIG. 3 shows an exemplary coherent Walsh-QPSK chip modulation apparatus for convenience of explanation. Same characteristics of transmitted signal can be obtained when one of four Walsh sequence generators 204,206,208 and 210 generates a logical NOT of a Walsh sequence and three of them generate three Walsh sequences, in which the four Walsh sequences have indexes 2k, 2k+1, 2i and 2i+1.

In FIG. 4, an exemplary DS-CDMA QPSK chip modulation apparatus for a channel in a base station in which present invention is embodied is illustrated.

In a base station, there are many CDMA channels; pilot channel, control signal channels and user data channels. Each channel is separated by different Walsh code spreading data of each channel. In FIG. 4, a user data 304 and a Walsh code generated by Walsh code generator 316 are combined by exclusive-OR gate 318. The Walsh code generated by Walsh code generator 316 of a channel is different from those of the other channels. This spread symbol, which is output of exclusive-OR 318, and inphase PN code generated by first PN code generator 300 are combined in exclusive-OR 308. The same spread symbol and quadrature PN code generated by second PN code generator 302 are combined in exclusive-OR 310. The same inphase and quadrature PN codes are used in each channel. Inphase sequence, output of exclusive-OR gate 308, is converted into analog signals after passing through first FIR filter 334, first gain control unit 342 and first D/A converter 350 as does it in a non-coherent DS-CDMA Walsh-QPSK chip modulation apparatus. Quadrature sequence, output of exclusive-OR gate 310, is switched at switch 320 to inverter 322 before being fed to second FIR filter 336 or directly to second FIR filter 336 under the control of system controller. Inverter 322 is a NOT gate. Inphase and quadrature analog signals, outputs of first and second D/A converters 350 and 352, generated in each channel are summed at inphase and quadrature signal summers (not shown), respectively, before modulating carriers, frequency up-conversion, amplified and transmitted (not shown).

The method in which a system controller controls switch 320 of each channel is to make equal the number of channels in which the switch 320 set to the position 354 and the number of channels in which the switch 320 set to position 356.

To explain the operation of this apparatus, assume that there are two channels in a base station, switch 320 of first channel set to position 354, and switch 320 of second channel is set to position 356. Then, the inphase and quadrature sequences with real value (0 to 1 and 1 to −1) of first channel are $D_1W_1PN_I$ and $D_1W_1PN_Q$, respectively, and the inphase and quadrature sequences of second channel are $D_2W_2PN_I$ and $-D_2W_2PN_Q$, respectively, where D,W, and PN denote data, Walsh code and PN code sequences, respectively. The sum of two inphase sequences of first and second channels is $(D_1W_1+D_2W_2)$ $PN_I$, and the sum of two inphase sequences of first and second channels is $(D_1W_1-D_2W_2)$ $PN_Q$.

Therefore, if sum of two inphase sequences increases, the sum of quadrature sequences is decreases. If there are many channels in a base station, the effect of this apparatus can be ignored since the sum of many channels has a small variation near its average value. However, if there are small number of channels in a base station as in personal communication service, the envelope variation of transmitted signal of a base station can be reduced. The small envelope variation of transmitted signal of a base station makes a portable terminal cost-effective since the portable terminal does not need to use an additional technique to linearize the received signal.

As explained above, as the present invention may be easily applicable to a chip modulation apparatus of various direct sequence spread spectrum QPSK series, it can provide a cost-effective miniatured system compared with the conventional system using a convention method even though the required dynamic amplification range of a large power amplifier is relatively narrow when sending signals.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations and any combination of our claims that may be made within the scope and spirit of the present invention are to be encompassed as further embodiments of the present invention.

What we claim:

1. In a direct sequence spread spectrum communications system wherein user binary information symbol sequence from one party are spread spectrum modulated and transmitted to another party for reducing the envelope variation of a transmitted signal, a spread spectrum modulating apparatus comprising:

means for generating a first and a second Walsh sequences of indexes (2i) and (2i+1), wherein i is an integer value greater than or equal to 0;

means for generating a pseudo-noise binary code;

means for generating spread symbol sequence operating exclusive-OR of said user binary information symbol sequence and said pseudo-noise binary code;

means for generating inphase sequence operating exclusive-OR of said spread symbol sequence and said first Walsh sequence, and for generating quadrature sequence operating exclusive-OR of said spread symbol sequence and said second Walsh sequence; and means for generating inphase signal shaping waveform of said inphase sequence, adjusting the gain and converting said shaped waveform of said inphase sequence into an analog signal, and for generating quadrature signal shaping waveform of said quadrature sequence, adjusting the gain and converting the shaped waveform of said quadrature sequence into an analog signal in which the sum of an inphase carrier modulated by said inphase signal and a quadrature carrier modulated by said quadrature signal is transmitted to an antenna via a frequency up-converter and an amplifier.

2. In a direct sequence spread spectrum communications system wherein two spread spectrum modulating apparatus of claim 1 are used for transmitting, in parallel, pilot symbol sequence and user information symbol sequence, a spread spectrum modulating apparatus for reducing the envelope variation of a transmitted signal wherein two spread spectrum modulating apparatus of claim 1 are used as a pilot signal generating means and data signal generating means, said pilot signal generating means spread spectrum modulates said pilot symbol sequence, said data signal generating means spread spectrum modulates said user information symbol sequence, an inphase carrier modulated by the sum of said inphase signal of said pilot signal generating means and said inphase signal of said data signal generating means, a quadrature carrier modulated by the sum of said quadrature signal of said pilot signal generating means and said quadrature signal of said data signal generating means, the sum of said modulated inphase carrier and said modulated quadrature carrier is transmitted to an antenna via a frequency up-converter and an amplifier, said means for generating said first and second Walsh sequences in said pilot signal generating means and said data signal generating means generate Walsh sequences of indexes (2i), (2i+1), (2k), and (2k+1), where i and k are different integer values, but one of four said means for generating said first and second Walsh sequences in said pilot signal generating means and data signal generating means generate the logical NOT of the Walsh sequence assigned.

3. A direct sequence code division multiple access system which comprises a plurality of spread spectrum modulating apparatus and system controller means, and said spread spectrum modulating apparatus comprises:

means for generating a Walsh sequence of index i;

means for generating an inphase pseudo-noise code, and for generating a quadrature pseudo-noise code;

means for generating spread symbol sequence operating exclusive-OR of said user information binary symbol sequence and said Walsh sequence of index i;

means for generating inphase sequence operating exclusive-OR of said spread symbol sequence and said inphase pseudo-noise code;

means for generating quadrature sequence operating, under control of said system controller, exclusive-OR or exclusive-NOR of said spread symbol sequence and said quadrature pseudo-noise code;

means for generating inphase signal shaping waveform of said inphase sequence, adjusting the gain and converting said shaped waveform of said inphase sequence into analog signal, and for generating quadrature signal shaping waveform of said quadrature sequence, adjusting the gain and converting shaped waveform of said quadrature sequence into analog signal, in which an inphase carrier is modulated by the sum of inphase signals of said spread spectrum modulating apparatus, a quadrature carrier is modulated by the sum of quadrature signals of said spread spectrum modulating apparatus, and the sum of said modulated inphase and quadrature carriers are transmitted to an antenna via a frequency up-converter and an amplifier, wherein said system controller means controls said means for generating quadrature sequence such that the number of said spread spectrum apparatus in which said means for generating quadrature sequence operates exclusive-OR is equal to the number of said spread spectrum apparatus in which said means for generating quadrature sequence operates exclusive-NOR.

* * * * *